No. 827,324. PATENTED JULY 31, 1906.
J. P. PUTNAM.
SEWER GAS TRAP.
APPLICATION FILED MAY 16, 1903.

WITNESSES:
Jas. E. Nickerson.
Thomas E. Hines

INVENTOR.
J. Pickering Putnam
BY

UNITED STATES PATENT OFFICE.

JOHN PICKERING PUTNAM, OF BOSTON, MASSACHUSETTS.

SEWER-GAS TRAP.

No. 827,324.        Specification of Letters Patent.        Patented July 31, 1906.

Application filed May 16, 1903. Serial No. 157,387.

*To all whom it may concern:*

Be it known that I, JOHN PICKERING PUTNAM, of Boston, in the county of Suffolk and State of Massachusetts, have invented certain new and useful Improvements in Sewer-Gas Traps, of which the following is a specification.

The object of my invention is to provide a water-seal trap which shall be secure against siphonage, back pressure, and other adverse influences tending to destroy the water seal of traps, and is an improvement on my inventions forming the subject of Letters Patent Nos. 625,899 and 706,255, dated May 30, 1899, and August 5, 1902, respectively.

Figure 1:
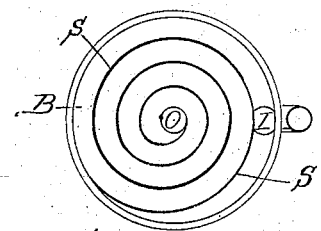
Figure 2:
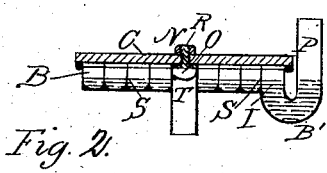
Figure 5:
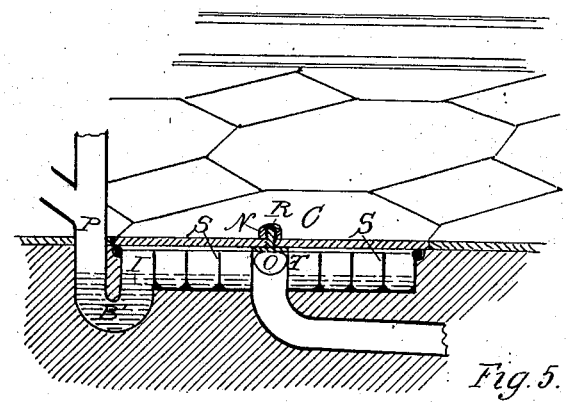
Figure 3:
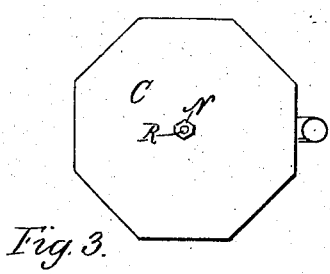
Figure 7:
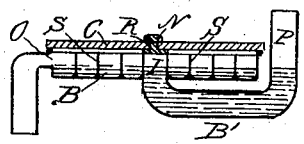
Figure 4:
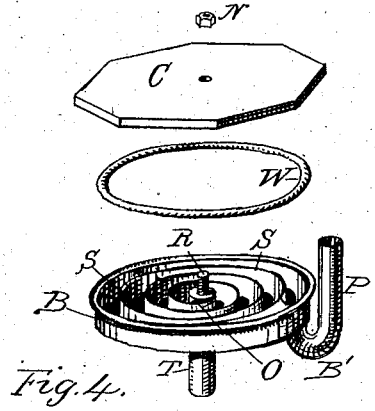
Figure 6:
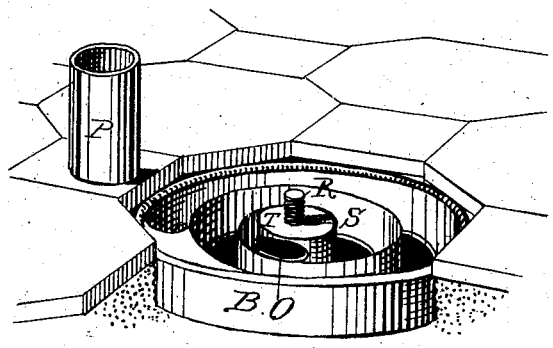

In the drawings, Figure 1 is a horizontal section, and Fig. 2 a vertical section, of the apparatus embodying my invention. Fig. 3 is a view of the top of the device looking down. Fig. 4 is a perspective view showing the trap opened and the cover and its coupling-nut and its washer or gasket raised above the body of the trap. Fig. 5 is a combined perspective view and vertical section of the trap as it appears set in a tiled floor, and Fig. 6 is a perspective view of the trap set in the floor and having the cover removed to show the interior construction. In this view part of the floor-tiling and concrete is removed to show the outside of the trap-body. Fig. 7 is a modification of the positions of inlet and outlet pipes.

Similar letters refer to similar parts throughout the views.

B is the body of the trap in the form of a shallow vessel having considerable horizontal extension.

S is a spiral partition set in the vessel and dividing it into a continuous spiral waterway extending from the inlet-mouth I of the trap to the outlet-mouth O, which is in the center of the trap. I do not wish, however, to confine myself to this precise arrangement of the inlet and outlet pipes, as they may be reversed, as shown in Fig. 7, the inlet being at or near the center and the outlet at one side, without affecting the principal features of my invention.

C is a cover to the vessel, secured to the body B by means of a nut N, screwed upon a threaded rod R, passing through the center of the cover. The rod R is rigidly connected with the top of the tube T. The cover makes a water-tight connection with the body B by means of the rubber washer W, which sets in a groove in the top edge of the vessel B. The cover C is polygonal in shape and perfectly flat to conform to the shape of tile work in which it is intended to be set, while the body B is circular to correspond with the spiral partitions within. I prefer to construct the cover of enameled metal or tile, either white or colored, to correspond with the rest of the tile-work in which it is to be placed.

The operation of my trap under normal conditions during a discharge of water from the fixture with which it is connected is as follows: The waste water discharged from the fixture rushes down through the inlet-pipe P and trap-bend B' and enters the body B through the inlet-mouth I. The spiral partition S causes the water to circulate in the body, rapidly scouring the sides of the spiral waterway from entrance to outlet O. When all the water in the fixture has escaped, the flow ceases and water stands in the body of the trap up to the level of the bottom of the outlet-opening O. The smooth unbroken course of the waterway, due to the continuous spiral partition, permits of a more rapid discharge of the water and a more efficient scouring action than is possible with any other form of trap of which I am aware in which the course of the water is always more or less broken and interrupted, the ordinary S-trap being excepted. Moreover, all parts of the passage-way throughout my trap having the same sectional area with all parts of the inlet and outlet pipes, the maximum effect of scour is obtained, and the body of the trap is thus kept as clean and free of sediment as any part of the inlet or outlet arms.

Under the abnormal conditions produced by siphonage the action of my device is as follows: A partial vacuum in the waste-pipe caused by a falling plug of water in the soil-pipe causes a suction on the outlet side of traps connected with the waste-pipe affected or, more scientifically speaking, a diminution of the normal atmospheric pressure on the outlet side of the trap. Air then presses upon the inlet side of the trap-seal to restore the equilibrium, and this pressure lowers the column of water in the downcast limb P of the trap, throwing an amount of water equivalent to the contents of this downcast limb out of the trap, the trap previously standing full of water up to the outlet-opening O. The downcast limb and its bend having thus lost their contents of water, air follows and escapes through the reservoir-chamber to the outlet, passing above the water therein. If the siphonage is very powerful, this air will by its friction against the water in the spiral passage-way drive some of it before it out into the waste-pipe through the outlet-opening; but the movement of the air and water being under such siphonage very rapid a strong centrifugal action is set up in the fluids in circling round and round in the spiral passage-way, and this centrifugal force separates the heavier fluid (the water) from the lighter (air) and forces the former against the outer walls of the spiral, to which it adheres, while the lighter air tends to hug the inner walls, because along them it finds the shorter and easier route to the outlet. The larger the number of spirals in the trap between the inlet and outlet openings the more time and space is allowed for this separation of the water from the air by centrifugal force, and correspondingly the greater will be the power of resistance of the trap against loss of its seal through siphoning action. All the drawings show traps having a sufficient number of spirals to resist the most powerful siphoning actions likely to occur in ordinary plumbing; but the resistance of the trap shown in Fig. 6 is much less than that of the traps shown in the other drawings. In virtue of this spiral arrangement of the partition in the reservoir the sectional area of the waterway throughout can be reduced to a size just equaling that of the inlet and outlet arms without destroying the resisting power of the trap to siphoning action nor retarding the outflow of the water in normal use more than would be done by a smooth straight pipe having equal pitch.

What I claim as my invention, and desire to secure by Letters Patent, is—

1. A sewer-gas trap having an inlet-arm and an outlet-arm and a reservoir-chamber between them, the chamber being provided with a partition forming a continuous, uninterrupted sprial waterway, one end of which connects with the inlet and the other with the outlet arm.

2. A sewer-gas trap having an inlet and an outlet arm and a reservoir-chamber between them, the inlet-arm entering the reservoir-chamber at a point below the connection with the chamber of the outlet-arm, and the outlet-arm connecting with the chamber at a point below the top thereof, the chamber being provided with a spiral partition-wall forming a continuous waterway from inlet to outlet.

3. A sewer-gas trap having an inlet-arm and an outlet-arm and a reservoir-chamber between them, the chamber being divided by a partition forming a continuous uninterrupted spiral waterway one end of which connects with the inlet and the other with the outlet arm, the sectional area of the passage-way and that of the inlet and outlet arms being approximately equal throughout.

4. In a trap the combination with a body having a continuous uninterrupted spiral passage, of an outlet-passage opening into the trap-body at a point elevated above the bottom thereof at one end of the spiral, and an inlet-pipe opening into the trap-body at the other end of the spiral at a level below that of the point of communication between the body and the outlet.

5. A sewer-gas trap having an inlet-arm, an outlet-arm and an intermediate reservoir-chamber, the outlet-arm consisting of a tube passing through the center of the chamber from bottom to top and having an inlet-port consisting of a perforation through the tube at one side and near its top, the bottom of the perforation being above the bottom of the chamber, and the inlet-tube entering the chamber at a point below the bottom of the perforation.

6. A sewer-gas trap having an inlet-arm, an outlet-arm, and an intermediate reservoir-chamber, the outlet-arm passing through the center of the chamber from bottom to top, the top of the chamber being removable and being held in place when closed by means of a nut screwed to the end of the outlet-arm.

7. A sewer-gas trap consisting of an inlet-arm and an outlet-arm, and an intermediate chamber, the chamber consisting of an uninterrupted spiral waterway, the inlet-arm connecting with the spiral at one end and the outlet-arm connecting with it at the other end, the overflow-mouth of the outlet-arm being above the mouth of the inlet-arm so as to form a trap.

8. In a trap the combination with a body having a continuous uninterrupted spiral passage, of an outlet-passage opening into the trap-body at a point elevated above the bottom thereof at the inner end of the spiral, and an inlet-pipe opening into the trap-body substantially at the outer end of the spiral, at a level below that of the point of communication between the body and the outlet, the cross-sectional area of the spiral passage approximating that of the inlet-pipe.

9. In a trap the combination with a body having a continuous uninterrupted spiral passage, of an outlet-passage opening into the trap-body at a point elevated above the bottom thereof at the inner end of the spiral, and an inlet-pipe opening into the trap-body substantially at the outer end of the spiral, at a level below that of the point of communication between the body and the outlet, the inlet-passage, outlet-passage and spiral passage being approximately equal in cross-section.

10. In a trap the combination of an inlet-arm and a reservoir-chamber having a removable top, and an outlet-arm passing through the center of the chamber from bottom to top, and means on the upper end of the outlet-arm for forcing the top upon the chamber so as to make with it a water and air tight joint.

In testimony whereof I have affixed my signature in presence of two witnesses.

JOHN PICKERING PUTNAM.

Witnesses:
  ROBERT D. WESTON SMITH.
  CHARLES WALCOTT.